US006586494B2

(12) United States Patent
Mejiritski et al.

(10) Patent No.: US 6,586,494 B2
(45) Date of Patent: Jul. 1, 2003

(54) RADIATION CURABLE INKJET COMPOSITION

(75) Inventors: Alexandre Mejiritski, Bowling Green, OH (US); Oleg V. Grinevich, Bowling Green, OH (US); Dustin B. Martin, Monroe, MI (US); Douglas C. Neckers, Perrysburg, OH (US)

(73) Assignee: Spectra Group Limited, Inc., Maumee, OH (US)

( * ) Notice: Subject to any disclaimer, the term of this patent is extended or adjusted under 35 U.S.C. 154(b) by 104 days.

(21) Appl. No.: 09/924,911

(22) Filed: Aug. 8, 2001

(65) Prior Publication Data

US 2003/0032692 A1 Feb. 13, 2003

(51) Int. Cl.$^7$ ............... C08F 2/46; C08F 2/50
(52) U.S. Cl. ........... 522/107; 522/104; 522/90; 522/96; 522/93; 522/153; 522/154; 522/152; 522/151; 430/269; 430/270.1; 430/280.1; 430/281.1; 430/284.1; 430/285.1; 428/482; 525/10; 525/921; 525/934
(58) Field of Search ............... 522/104, 107, 522/153, 157, 154, 152, 90, 96, 93; 430/269, 270.1, 280.1, 281.1, 284.1, 285.1; 428/482; 525/10, 921, 934

(56) References Cited

U.S. PATENT DOCUMENTS

| | | | | | |
|---|---|---|---|---|---|
| 4,129,488 | A | * | 12/1978 | McGinniss | 525/438 |
| 4,327,199 | A | * | 4/1982 | Coran et al. | 525/176 |
| 4,606,994 | A | * | 8/1986 | Illers et al. | 430/300 |
| 4,983,712 | A | * | 1/1991 | Meixner et al. | 528/272 |
| 5,075,393 | A | * | 12/1991 | Thompson | 525/444 |
| 5,418,292 | A | * | 5/1995 | Bode et al. | 525/131 |
| 5,830,927 | A | * | 11/1998 | Vanderhoff et al. | 522/81 |
| 5,844,048 | A | * | 12/1998 | Kaplan et al. | 525/330.3 |
| 5,872,192 | A | * | 2/1999 | Kaplan et al. | 525/438 |
| 6,380,279 | B1 | * | 4/2002 | Moens et al. | 522/111 |
| 6,384,102 | B1 | * | 5/2002 | Moens et al. | 522/110 |

FOREIGN PATENT DOCUMENTS

| | | | |
|---|---|---|---|
| EP | 03550592 | * | 2/1990 |
| WO | WO9855549 | * | 12/1998 |

* cited by examiner

Primary Examiner—James J. Seidleck
Assistant Examiner—Sanza L. McClendon
(74) Attorney, Agent, or Firm—Thompson Hine LLP

(57) ABSTRACT

A radiation-curable inkjet composition for forming 3-D models or images comprising a semi-crystalline or crystalline, low-shrinkage, radiation-curable oligomeric material, a photoinitiator, and a diluent, said inkjet composition having a viscosity of between about 10 to about 50 cps at at least one temperature between 50 to 140° C.

27 Claims, No Drawings

RADIATION CURABLE INKJET COMPOSITION

BACKGROUND OF THE INVENTION

The present invention relates to a radiation-curable inkjet composition, and more particularly, to a radiation-curable inkjet composition for forming 3-D models or images and to a method for forming 3-D models or images using such radiation-curable inkjet compositions. The radiation-curable inkjet composition of the present invention comprises a semi-crystalline or crystalline, low-shrinkage, radiation-curable oligomeric material, a photoinitiator and a diluent. The composition will typically have a viscosity of between about 10 to about 50 centipoise at at least one temperature between about 50 to 140° C. in order to be jettable from the printer head of the inkjet printer.

Various methods are currently used for forming three-dimensional objects rapidly and automatically from three-dimensional computer data representing the objects. These methods are collectively referred to as rapid prototyping and manufacturing systems (RP & M). Rapid prototyping and manufacturing systems can generally be divided into three categories of manufacturing systems, namely, stereolithography, laminated object manufacturing, and selective deposition modeling.

In general, three-dimensional objects formed by rapid prototyping and manufacturing systems typically involve the formation of three-dimensional objects from computer data corresponding to the object by building up and adhering cross-sectional layers of the three-dimensional object. Alternatively, three-dimensional object production by rapid prototype and manufacturing systems is not limited to layer-by-layer build-up processes but may also include other methods that involve forming and adhering portions of the three-dimensional object which do not necessarily correspond to layers of the 3-D image.

Stereolithography involves the formation of three-dimensional objects based on the successive formation of layers of a fluid-like medium adjacent to previously formed layers of medium and the selective solidification of these layers according to cross-sectional data representing successive slices of the three-dimensional object in order to form and adhere successive layers. In conventional stereolithography, a three-dimensional object is constructed by establishing a thin layer of a photocurable composition on the surface of a platform immersed in a bath of the composition and scanning the layer with a laser beam. The laser controls the X, Y dimension of the model. The Z dimension is controlled by incrementally lowering the platform to greater and greater depths after each successive layer corresponding to a cross-section of the model is polymerized or cross-linked.

The production of three-dimensional objects by laminated object manufacturing is characterized by successively cutting object cross-sections having desired shapes and sizes out of sheets of material, and then adhering the resulting cross-sections together to form the three-dimensional object.

Selective deposition modeling (SDM) involves the build-up of three-dimensional objects by selectively depositing solidifiable material on a lamina-by-lamina basis according to cross-sectional data representing slices of the three-dimensional object. Some selective deposition modeling systems can be used in an office environment to produce a prototype. Selective deposition modeling systems are known and include Thermojet and Actua 3-D printing machines.

Selective deposition modeling techniques, such as thermal stereolithography, fused deposition modeling and ballistic particle manufacturing, are described in the following references, the disclosures of which are incorporated herein by reference: U.S. Pat. Nos. 5,141,680; 5,121,329; 5,340,433; 5,260,009; 4,665,492; 5,134,569 and 5,216,616.

Compositions useful in thermal stereolithography must be capable of being dispensed from inkjet print heads and other dispensers and also must be capable of forming accurate three-dimensional objects with suitable strength properties after solidification or curing. Inkjet compositions for forming three-dimensional models or images must have a low viscosity at the dispensing temperature and must be stable for prolonged periods of time to be jettable from the printer head of the 3-D printer head.

SUMMARY OF THE INVENTION

The present invention provides a radiation-curable inkjet composition for forming 3-D models or images comprising a semi-crystalline or crystalline, low-shrinkage, radiation-curable oligomeric material, a photoinitiator and one or more diluents. In accordance with one embodiment of the invention, the inkjet composition has a viscosity of between about 10 to about 50 cps at at least one temperature between about 50 to 140° C. In accordance with some embodiments of the invention, the inkjet composition is solid at ambient conditions but forms a flowable liquid when subjected to elevated temperatures. The radiation-cured composition exhibits low-volume shrinkage during the transition from an uncrosslinked solid to a crosslinked solid. Low-shrinkage materials in accordance with the present invention are those exhibiting a volume shrinkage of less than about 7%, preferably less than about 2%. The radiation-cured composition also exhibits the physical strength characteristics necessary to accurately form three-dimensional objects with suitable strength.

The radiation-curable inkjet compositions of the present invention comprise one or more semi-crystalline or crystalline oligomers. The crystalline nature of the material is considered desirable because the inkjet compositions exhibit lower melting point of the solid resin and lower viscosity in the molten state as compared to amorphous materials. In accordance with one embodiment of the present invention, the semi-crystalline or crystalline, radiation-curable material is a methacrylated polyester oligomer that melts at about 70 to 100° C. and has a molten viscosity of under 300 cps at temperatures higher than 120° C. In accordance with another embodiment of the present invention, the semi-crystalline or crystalline radiation-curable material is a methacrylated urethane oligomer that melts at about 60 to 80° C. and has a molten viscosity of under 100 cps at temperatures higher than 120° C.

In addition to the semi-crystalline or crystalline, low-shrinkage, radiation-curable material, the radiation-curable inkjet composition of the present invention also comprises a photoinitiator and a diluent. Photoinitiators useful in the present invention include those typically used in the art to initiate photopolymerization of ethylenically unsaturated compounds. A diluent is included in the radiation-curable inkjet composition to lower the viscosity and/or to provide required properties, such as hardness and strength. Diluents useful in the present invention may be liquid or solid at room temperature and may be reactive or non-reactive diluents.

In another aspect of the present invention, a method for forming at least a portion of a 3-D model or image using a radiation-curable, inkjet composition is disclosed. In general, this method comprises the steps of providing a radiation-curable composition comprising a semi-crystalline or crystalline, low-shrinkage, radiation-curable oligomer material, a photoinitiator and a diluent, wherein the composition is a solid at room temperature; heating the composition to a temperature between about 50 and 140° C. so as to melt the composition; selectively dispensing the composition at a dispensing temperature from about 50 to about 140° C., wherein the composition is selectively dispensed to correspond to a portion of the 3-D model or image; and exposing the selectively dispensed composition to radiation to cure the composition, thereby forming at least a portion of a 3-D model or image. The described method can be repeated to form additional portions of the 3-D model or image.

DETAILED DESCRIPTION OF THE INVENTION

As used herein, ambient conditions refer to room temperature (about 25° C.) and atmospheric pressure. All parts and percentages specified herein are by weight unless otherwise specified. Furthermore, "non-crystalline" (otherwise referred to as "amorphous") broadly defines materials which show no or trace crystallization or melting point as determined by differential scanning calorimetry (DSC). Additionally, the term "crystalline" includes crystalline as well as semi-crystalline materials and broadly defines oligomers with a discernable crystallization or melting point by DSC.

The present invention provides a radiation-curable inkjet composition and associated method for building 3-D models or images using such compositions. The inkjet composition is jetted through an appropriate dispenser (such as an inkjet type print head) at elevated temperatures above ambient and the 3-D models or images formed in accordance with the present invention exhibit the desired strength, handling and dimensional stability properties for the final cured model. The radiation-curable inkjet composition of the present invention can be utilized in any single or multi-orifice dispensing apparatus typically used in the production of three-dimensional models or images. Viscosity requirements for the radiation-curable inkjet composition may vary depending on the particular inkjet head or dispensing apparatus used. Typically, the inkjet composition must have a viscosity of between about 10 to about 50 cps at at least one temperature between about 50 to 140° C. In more specific embodiments of the present invention, the inkjet composition may have a viscosity of between 10 and 15 cps at at least one temperature between 125 to 135° C.

Radiation-curable inkjet compositions in accordance with the present invention comprise a semi-crystalline or crystalline, low-shrinkage, radiation-curable oligomeric material, a photoinitiator, and a diluent. Materials suitable for use as radiation-curable materials include a mixture of oligomers with at least one semi-crystalline or crystalline oligomer. Such semi-crystalline or crystalline oligomers exhibit low-shrinkage during the conversion from an uncrosslinked solid to a crosslinked solid upon exposure to a suitable radiation source. The crystallinity of the oligomer results in a lower viscosity for the material in the molten state. Furthermore, in accordance with one embodiment of the present invention the radiation-curable material is a solid at room temperature and the crystalline nature of the material leads to a lower melting point of the solid oligomeric material. The radiation curable base material is typically present in an amount from about 10% to about 40% by weight. In particular embodiments of the invention, the radiation curable material is present in amounts from about 15% to 35%.

The radiation-curable material of the present invention is curable by application of suitable radiation, such as ultraviolet (UV) radiation. In accordance with one aspect of the invention, the radiation-curable material cures in the presence of a free radical initiator. Free radical polymerizable materials generally have a degree of ethylenic unsaturation. Examples of free radical curable materials include, but are not limited to, acrylate resins, aminoplast derivatives having pendant carbonyl groups, isocyanurate derivatives having at least one pendant acrylate group, isocyanate derivatives having at least one pendant acrylate group, unsaturated polyesters, and other ethylenically unsaturated compounds, and mixtures and combinations thereof. Acrylates are preferred for use in the radiation-curable inkjet composition of the present invention. Examples of such materials include, but are not limited to, mono- or multi-functional acrylates (i.e., acrylates and methacrylates), acrylated epoxies, acrylated polyesters, acrylated aromatic or aliphatic urethanes, acrylated acrylics, acrylated silicones, and combinations or blends thereof.

In accordance with a particular embodiment of the invention, the radiation-curable material comprises a crystalline or semi-crystalline methacrylated polyester, and, more particularly, comprises a dimethacrylated semi-crystalline polyester oligomer. Examples of particularly useful crystalline polyesters containing end methacryloyl groups are disclosed in U.S. Pat. No. 5,639,560, which is incorporated herein by reference. An example of a particularly useful dimethacrylated semi-crystalline polyester oligomer is Uvecoat 9010 (commercially available from UCB Radcure). Uvecoat 9010 melts at about 84° C. and has a viscosity lower than 300 cps at temperatures higher than 120° C.

In accordance with another embodiment of the invention, the radiation-curable oligomeric material is a dimethacrylated semi-crystalline urethane. An example of a particularily useful dimethacrylated semi-crystalline urethane oligomer is RX03739 from UCB Radcure. RX03739 melts at about 80° C. and has a viscosity lower than 40 cps at temperatures higher than 80° C.

The radiation-curable inkjet composition of the present invention further comprises a photoinitiator. The photoinitiators which can be used according to the present invention are chosen from those commonly used for this purpose.

The appropriate photoinitiators which can be used are aromatic carbonyl compounds, such as benzophenone and its alkylated or halogenated derivatives, anthraquinone and its derivatives, thioxanthone and its derivatives, benzoin ethers, aromatic or non-aromatic alphadiones, benzil dialkyl acetals, acetophenone derivatives and phosphine oxides.

Photoinitiators which may be suitable are, for example, 2,2'-diethoxyacetophenone, 2-, 3- or 4-bromoacetophenone, 2,3-pentanedione, hydroxycyclohexyl phenyl ketone, benzaldehyde, benzoin, benzophenone, 9,10-dibromoanthracene, 2-hydroxy-2-methyl-1-phenylpropan-1-one, 4,4'-dichlorobenzophenone, xanthone, thioxanthone, benzil dimethyl ketal, diphenyl (2,4,6-trimethylbenzyl) phosphine oxide, and the like. It may optionally be advantageous to use a photoactivator, such as tributylamine, 2-(2-aminoethylamino) ethanol, cyclohexylamine, diphenylamine, tribenzylamine or aminoacrylates such as, for example, the addition product of a secondary amine, such as dimethylamine, diethylamine, diethanolamine, and the like, with a polyol polyacrylate, such as the diacrylate of trimethylolpropane, of 1,6-hexanediol, and the like.

The photoinitiator is typically present in an amount from about 0.05 to about 5% by weight. The selected photoinitiator is preferably optimized to maximize absorbance at the operational wavelength of the selected UV radiation source. Examples of specific photoinitiators include 1-hydroxycyclohexylphenyl ketone, commercially available under the trade name Irgacure 184 and phenylbis (2,4,6-trimethylbenzoyl) phosphine oxide, commercially available under the trade name Irgacure 819 (both available from Ciba Specialty Chemicals Corporation). A mixture of photoinitiators may be used.

A diluent is included in the radiation-curable inkjet composition to reduce the viscosity of the composition to the desired levels. Furthermore, the diluent can be selected to provide or improve other properties relating to the radiation-curable inkjet composition, such as hardness, flexibility and strength. The diluent may be unreactive or reactive. Furthermore, the diluent may be a liquid or a solid at room temperature. Reactive diluents have functional groups which are capable of polymerizing when the reactive diluent is exposed to actinic radiation at an energy or wavelength level which is capable of inducing cross-linking or chain extension in the polymer. If the diluents are multi-functional then they also serve as crosslinkers for the matrix.

Reactive diluents preferably are monomeric or oligomeric, and include, but are not limited to, mono-, di-, tri-, and multi-functional unsaturated ester monomers and the like. Examples of suitable reactive diluents include monoacrylates, such as cyclohexyl acrylate, 2-ethoxy ethyl acrylate, 2-methoxy ethyl acrylate, 2(2-ethoxyethoxy) ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, β-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, and the like, diacrylates, such as 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like, polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl) isocyanurate triacrylate, pentaacrylate ester, and the like, including ethoxylated versions thereof, epoxy acrylates, polyester acrylates, polyether polyol acrylates, urethane acrylates, amine acrylates, acrylic acrylates, and the like. Mixtures of two or more materials can also be employed as the reactive diluent. Suitable reactive diluents are commercially available from, for example, Sartomer Co., Inc., Henkel Corp., Radcure Specialties, and the like. The diluent is typically present in an amount from about 60 to about 90% by weight and preferably in amounts from about 65 to about 85% percent by weight of the radiation-curable inkjet composition.

The radiation-curable inkjet composition of the present invention may include additional oligomeric materials of a non-crystalline nature. Non-crystalline oligomers can be used to improve toughness and other properties of the final product. One skilled in the art can determine the useful oligomers to achieve the desired properties in the finished product. Specific examples of useful non-crystalline oligomers include, but are not limited to, Ebecryl 4833, Ebercryl 8402 (both available from UCB) and CN 981, CN 980 and CN 984 (available from Sartomer) and the like.

The radiation-curable inkjet composition of the present invention may also include additional additives such as antioxidants, surfactants, leveling additives, photoinitiator stabilizers, wetting agents and pigment stabilizers. These optional substances may be incorporated into the radiation-curable inkjet composition in amounts as needed to achieve the desired effect as is known in the art.

The radiation-curable inkjet compositions of the present invention are produced by conventional techniques. The components may be dry blended or ground together, and then melt blended in an extruder with heating above the melting point of the resin system. The extruded composition may be cooled and broken into chips and then ground in a mill with cooling to produce a fine particle size resin powder. The radiation-curable dry powders can be placed into a dispensing container and mixed at an elevated temperature to provide a homogeneous solution. A dispensing container is attached to a selective deposition modeling system wherein the inkjet composition is liquified and dispensed at preselected positions to produce at least a portion of a three-dimensional object or image. Alternatively, the components of the radiation-curable inkjet composition can be simply ground and mixed at an elevated temperature to provide a homogeneous solution, which is then dispensed in accordance with the above procedure.

The inkjet composition is exposed to radiation to cure the selectively dispensed portions of the 3-D image or model. In accordance with one embodiment of the invention, standard UV light sources are used to cure the selectively dispensed composition. Such standard UV sources include medium pressure mercury-, iron doped mercury-, and/or gallium doped mercury-vapor lamps, e.g. 300-watt Fusion H-, D- and/or V-lamps.

The present invention is described more fully in the following non-limiting examples.

EXAMPLE 1

Uvecoat 9010 (UCB Radcure) is a dimethacrylated semi-crystalline polyester resin that melts at about 84° C. When molten its viscosity is low; it is under 300 cps at temperatures higher than 120° C. Uvecoat 9010 was ground with 3% of visible/UV radical initiator Irgacure 819. The mixture was melted and multiple coatings and parts of different thickness and shape were produced.

The solidified mass is a paraffin-like brittle yellow matte material. This brittle material was exposed to four types of radiation: Fusion UV H-bulb, overhead projector, Xenon lamp RC-740 and Postcure apparatus made by 3D Systems (PCA-250). In all four cases, the material became very firm, tough to break polymer. The yellow color of the material faded which is indicative of the initiator decomposition and consequent radical processes in the polymer matrix.

Dog bone shaped test specimens were prepared according to ASTM D638. A Lloyd Instruments L500X Instron fitted with a 2.5 kN load cell was used to measure tensile strength and elongation of the test specimens. The test specimens were pulled at a speed of 20 mm/min. Tensile strength of cured and uncured material was measured. The uncured part broke at less than 36 psi while the cured material held up to 3500 psi.

In MEK and Jet Reference Fuel (mixture of saturated and aromatic hydrocarbons) resistance tests were carried out for cured and uncured material. Weighed portions of both materials were immersed in the respective solutions. The tests showed that the cured parts did not swell significantly in either solvent. The uncured pieces were clearly dissolving in both solvents as they both broke into pieces and lost in weight. Also, the uncured material became even more brittle in both solvents.

The resin mixed with initiator was heated to 105° C. in the dark. There was no visual increase in viscosity in 24 hours.

EXAMPLE 2

Uvecoat 9010 (UCB Radcure) (35 wt %) and triethylene glycol dimethacrylate (SR 205, Sartomer) (65 wt %) were mixed with 1% Irgacure 819.

The viscosity of this mixture was about 13 cps at 125° C. The uncured mixture was a solid paste-like material and did not have any mechanical strength. The following parameters were measured for the cured material (2 passes 300 W Fusion UV H-bulb at 10 fpm): tensile strength—2900 psi, elongation—5.5%.

EXAMPLE 3

Uvecoat 9010 (UCB Radcure) (35 wt %), SR 368 (Sartomer) (5 wt %), Stearyl Acrylate (Cognis) (10 wt %) and 1,6-hexanediol diacrylate (HDDA, UCB Radcure) (50 wt %) were mixed with 2% Irgacure 819.

The viscosity of this mixture was about 13 cps at 125° C. The uncured mixture was a solid paste-like material and did not have any mechanical strength. The following parameters were measured for the cured material (2 passes 300 W Fusion UV H-bulb at 10 fpm): tensile strength—1670 psi, elongation—14%.

EXAMPLE 4

Uvecoat 9010 (UCB Radcure) (25 wt %), Ebecryl 4833 (UCB Radcure) (10 wt %), tris (25 hydroxy ethyl) isocyanurate triacrylate (SR 368, Sartomer) (10 wt %), triethylene glycol dimethacrylate (SR 205, Sartomer) (45 wt %) and alkoxylated cyclohexane dimethanol diacrylate (CD 582, Sartomer) (10 wt %) were mixed with 1% Irgacure 819.

The viscosity of this mixture was about 13.5 cps at 125° C. The uncured mixture was a solid paste-like material and did not have any mechanical strength. The following parameters were measured for the cured material (2 passes 300 W Fusion UV H-bulb at 10 fpm): tensile strength—3300 psi, elongation—6.7%.

EXAMPLE 5

RX 03739 methacrylated urethane oligomer (UCB Radcure) (40 wt %), Ebecryl 4833 (UCB Radcure) (40 wt %), tris (2-hydroxy ethyl) isocyanurate triacrylate (SR 368, Sartomer) (5 wt %), triethylene glycol dimethacrylate (SR 205, Sartomer) (15 wt %) were mixed with 1% Irgacure 819.

The viscosity of this mixture was about 15.8 cps at 125° C. The uncured mixture was a solid paste-like material and did not have any mechanical strength. The following parameters were measured for the cured material (2 passes 300 W Fusion UV H-bulb at 10 fpm): tensile strength—8000 psi, elongation—7.1%.

What is claimed is:

1. A radiation-curable inkjet composition for forming 3-D models or images comprising:
    a semi-crystalline or crystalline, low-shrinkage, radiation-curable oligomeric material;
    a photoinitiator; and
    a diluent,
    said inkjet composition having a viscosity of between about 10 to about 50 cps at at least one temperature between about 50 to 140° C.

2. The composition of claim 1 wherein said semi-crystalline or crystalline radiation curable material is selected from the group consisting of methacrylated polyester oligomers and methacrylated urethane oligomers.

3. The composition of claim 2 wherein said methacrylated polyester oligomer is a dimethacrylated semi-crystalline polyester.

4. The composition of claim 1 wherein said diluent is a reactive diluent.

5. The composition of claim 1 wherein said diluent is a monofunctional, difunctional or tri-functional monomeric material.

6. The composition of claim 5, wherein said diluent is selected from the group consisting of tris (2-hydroxy ethyl) isocyanurate triacrylate, triethylene glycol dimethacrylate and alkoxylated cyclohexane dimethanol diacrylate and mixtures thereof.

7. The composition of claim 6 wherein said diluent is triethylene glycol dimethacrylate.

8. The composition of claim 1 wherein said photoinitiator is a free radical-type photoinitiator.

9. The composition of claim 8 wherein said photoinitiator is phenylbis(2,4,6-trimethylbenzoyl)phosphine oxide.

10. The composition of claim 1 wherein said composition comprises from about 10 to about 40% by weight of the composition of the semi-crystalline or crystalline radiation curable oligomeric material.

11. The composition of claim 1 wherein said composition comprises from about 0.05 to about 5% by weight of the photoinitiator.

12. The composition of claim 1, wherein said composition comprises from about 60 to about 90% by weight of the diluent.

13. The composition of claim 1 wherein said inkjet composition has a viscosity of between about 10 to about 15 cps at at least one temperature between 125 and 135° C.

14. An inkjet composition useful in building 3D models comprising:
    (a) a semi-crystalline or crystalline oligomer selected from the group consisting of polyester oligomers containing end methacrylyl groups and dimethacrylated urethane oligomers;
    (b) a photoinitiator; and
    (c) a diluent selected from the group consisting of monofunctional, difunctional and trifunctional unsaturated ester monomers; wherein said inkjet composition has a viscosity between about 10 and 50 cps at at least one temperature between about 125 and about 135° C.

15. The composition of claim 14 wherein said composition comprises from about 10 to about 40% by weight of the semi-crystalline or crystalline oligomer;
    from about 0.05 to about 5% by weight of the photoinitiator; and
    from about 60 to about 90% by weight of the diluent.

16. The composition of claim 14 wherein said inkjet composition has a viscosity between about 10 and 15 centipoise at at least one temperature between about 125° and about 135° C.

17. The inkjet composition of claim 14 wherein said composition is a solid at 25° C.

18. A method of forming at least a portion of a 3D model or image using a radiation-curable, inkjet composition, comprising the steps of:

a) providing a radiation curable composition comprising:
   i) a semi-crystalline or crystalline, low-shrinkage, radiation curable oligomeric material;
   ii) a photoinitiator; and
   iii) a diluent wherein said composition is a solid at room temperature;
b) heating said composition to a temperature between about 50 to 140° C.;
c) selectively dispensing said composition at a dispensing temperature from about 50 to about 140° C., said composition being selectively dispensed to correspond to said portion of the 3D model or image; and
d) exposing said selectively dispensed composition to radiation to cure said composition.

19. The method of claim 18 wherein the semi-crystalline or crystalline, low-shrinkage, radiation curable material is selected from the group consisting of polyester oligomers containing end methacrylyl groups and methacrylated urethane oligomers and said diluent is a monofunctional, difunctional or tri-functional monomeric material.

20. The method of claim 18 wherein said radiation curable composition has a viscosity between about 10 to about 50 centipoise at said dispensing temperature.

21. The method of claim 20 wherein said radiation curable composition has a viscosity between about 10 to about 15 centipoise at said dispensing temperature.

22. The method of claim 21 wherein said dispensing temperature is from about 125 to about 135° C.

23. The method of claim 18 wherein said radiation used in step (d) is ultraviolet radiation.

24. The method of claim 18 further comprising:
   e) repeating steps c) and d) to form additional portions of the 3D model or image.

25. The method of claim 18 wherein said radiation curable composition comprises:
   from about 10 to about 40% by weight of the semi-crystalline or crystalline radiation curable oligomeric material; from about 0.05 to about 5% by weight of the photoinitiator; and from about 60 to about 90% by weight of the diluent.

26. The method of claim 25 wherein said semi-crystalline or crystalline material is a polyester oligomer containing end methacrylic groups; said photoinitiator is a free-radical type photoinitiator; and said diluent is a reactive diluent.

27. The method of claim 26 wherein said reactive diluent is selected from the group consisting of tris (2-hydroxy ethyl) isocyanurate triacrylate, triethyline glycol dimethacrylate and alkoxylated cyclohexane dimethanol diacrylate.

* * * * *